United States Patent
Habibvand

(10) Patent No.: US 8,033,736 B2
(45) Date of Patent: Oct. 11, 2011

(54) SWASHPLATE BEARING ASSEMBLY WITH ENHANCED ALLOYS

(75) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 522 days.

(21) Appl. No.: 12/170,725

(22) Filed: Jul. 10, 2008

(65) Prior Publication Data

US 2009/0028708 A1    Jan. 29, 2009

Related U.S. Application Data

(60) Provisional application No. 60/959,327, filed on Jul. 12, 2007.

(51) Int. Cl.
F16C 33/62 (2006.01)
F16C 33/60 (2006.01)

(52) U.S. Cl. .......................... 384/506; 384/492; 384/913

(58) Field of Classification Search .................. 384/505, 384/506, 492, 912, 913; 416/114
See application file for complete search history.

(56) References Cited

U.S. PATENT DOCUMENTS

| | | | |
|---|---|---|---|
| 4,150,978 A * | 4/1979 | Schlatter et al. | 420/37 |
| 4,808,226 A * | 2/1989 | Adam | 384/912 |
| 5,298,323 A * | 3/1994 | Narai et al. | 428/325 |
| 5,861,067 A * | 1/1999 | Hetzner | 384/912 |
| 5,879,480 A * | 3/1999 | Hetzner | 148/644 |
| 6,109,876 A * | 8/2000 | Schreiber | 416/114 |
| 6,302,356 B1 * | 10/2001 | Hawkins | 244/17.11 |
| 2007/0128037 A1 * | 6/2007 | Schmaling et al. | 416/134 A |

* cited by examiner

*Primary Examiner* — Thomas R Hannon
(74) *Attorney, Agent, or Firm* — Michaud-Kinney Group LLP

(57) ABSTRACT

An improved swashplate assembly of the main rotor of an AH-64 Apache helicopter includes a stationary swashplate and a rotating swashplate and a ball bearing between the swashplates, the ball bearing having an outer ring, an inner ring, two sets of balls between the inner ring and the outer ring, and a wire loop cage between the inner ring and the outer ring. The improvement includes that the inner ring, the outer ring and the balls are formed from an M50 alloy.

14 Claims, 1 Drawing Sheet

SWASHPLATE BEARING ASSEMBLY WITH ENHANCED ALLOYS

CROSS-REFERENCE TO RELATED APPLICATIONS

This application claims the benefit of U.S. provisional application No. 60/959,327 filed Jul. 12, 2007, which is hereby incorporated herein by reference, in its entirety.

FIELD OF THE INVENTION

This invention relates to ball bearings, and in particular, to ball bearings in the swashplate assembly of a rotary wing aircraft.

BACKGROUND

Rotary wing aircraft, such as helicopters, provide unique environments for the use of ball bearings, particularly in their rotor systems. For example, the bearings in helicopter swashplates and in rotor blade mounts must be specially designed to provide reliable ongoing use under the type of load and speed conditions that are unique to helicopters. Thus, the use of bearings in other types of machines is nonanalogous to rotary wing aircraft bearings in general and to helicopter bearings in particular. For this reason, bearing designs that are useful in other kinds of machines are not assumed by those of ordinary skill in the art to be suitable for helicopter swashplates, rotor blade mounts, etc.

The ball bearing for the main rotor of a helicopter generally comprises an outer ring, two inner rings and two sets of balls, all made from an alloy designated as CEVM-52100 with a Rockwell hardness of at least HRC 58, where "CEVM" stands for "Consumable Electrode Vacuum Melting." The 52100 alloy nominally contains iron with 0.98-1.10% carbon, 0.25-0.45% manganese, up to 0.025 phosphorous, up to 0.025 sulfur, 0.15-0.30, 32% silicon and 1.30, 32-1.60% chromium by weight. The balls have a diameter of about 1.11 centimeter (cm) (about 7/16 inch (in.)) and there are usually 83 balls per row. The bearing includes a looped wire cage for each row of balls, for maintaining separation between the balls. The wire cage is made from a 17-7 PH iron alloy, which nominally contains about 16.8% chromium, about 0.8% carbon, about 7.3% nickel and about 1.2% aluminum by weight. Among other problems, the bearing suffers from breakage of the wire cage.

SUMMARY

The present invention resides in one aspect in an improved swashplate assembly of the main rotor of a helicopter. The swashplate assembly includes a stationary swashplate and a rotating swashplate with a ball bearing therebetween. The ball bearing comprises an outer ring, an inner ring, two sets of balls between the inner ring and the outer ring, and a wire loop cage between the inner ring and the outer ring. The inner ring, the outer ring and the balls are formed from an M50 alloy.

DETAILED DESCRIPTION OF THE INVENTION

This invention provides an improvement to helicopters, and in particular to the rotor swashplate assembly. The invention relates to a bearing for the swashplate assembly, the bearing comprising rings and roller balls made from an alloy known as M50, for example, CEVM-M50 or VIM-VAR-M50, "VIM-VAR" indicating that the material is vacuum induction melted-vacuum arc re-melted, as is known in the art. An M50 alloy nominally comprises iron with about 0.8% carbon, about 4.1% chromium, about 4.25% molybdenum and about 1% vanadium. In specific embodiments, the rings have a Rockwell hardness of HRC 60-64 and the balls have a Rockwell hardness of at least about HRC 60. In addition, the bearing comprises a looped wire cage for keeping the balls from contacting each other.

Figure 1:
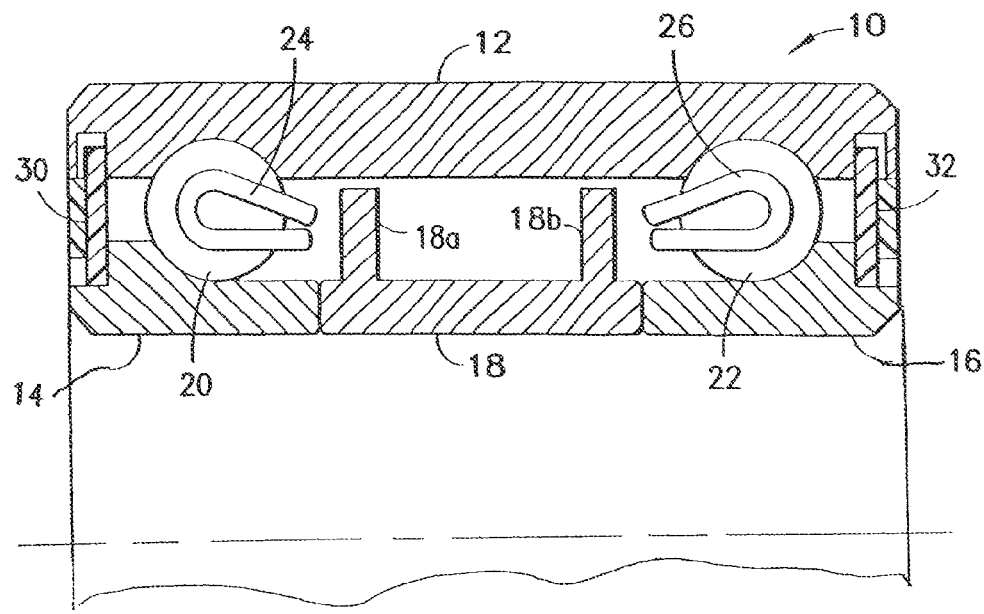
FIG. 1 is a partial cross-sectional view of a bearing pursuant to a specific embodiment of the invention.

A bearing 10 according to one particular embodiment of this invention is shown in FIG. 1. Bearing 10 comprises an outer ring 12 and two inner rings 14, 16 disposed within the outer ring 12. A spacer ring 18 is disposed between inner ring 14 and inner ring 16. Spacer ring 18 includes two flanges 18a, 18b that extend towards outer ring 12.

A first set of balls 20 is disposed between outer ring 12 and inner ring 14, and a second set of balls 22 is disposed between outer ring 12 and inner ring 16. Each set of balls 20, 22 includes 83 balls. There is a looped wire cage 24, 26, for each set of balls, for keeping the balls from contacting adjacent balls. The bearing 10 includes a molded seal 30, 32 at each axial end of the bearing, extending between the inner ring and the outer ring. The seals 30, 32 are formed from a fluorosilicone elastomer material. The seals 30, 32 inhibit the entry of contaminants into the load zone of the bearing and help to retain lubricant therein.

In accordance with this invention, outer ring 12, inner rings 14 and 16, and balls 20, 22 are all formed from M50 steel alloy.

The wire cages 24, 26 may be formed from alloy 17-7 PH. The spacer ring 18 may be formed from a 52100 alloy, and may be heat treated to a Rockwell hardness of at least about HRC 58, optionally at least HRC 60.

Optionally, bearing 10 may comprise a third set of balls that is seated between spacer ring 18 and outer ring 12. For example, a third set of balls may be seated between flanges 18a, 18b.

In one particular embodiment, the bearing has the characteristics indicated in the following Table 1:

TABLE 1

| BEARING DATA | |
|---|---|
| BEARING ASSEMBLY DATA | DOUBLE ROW BALL BEARING |
| DIAMETRAL CLEARANCE | .0023-.0030° OF ASSEMBLY |
| AXIAL PLAY | .0035-.0041° OF ASSEMBLY |
| CONTACT ANGLE | 39.5° REF |
| ROLLER END TO CHANNEL | N/A |
| ROLLER END FLOAT | N/A |
| ELEMENT DROP, ASSEMBLY | NON-SEPARABLE (IN NORMAL |
| DIAMETRAL CAGE TO PILOT- | N/A |
| CAGE POCKET CLEARANCE, | N/A |
| FACES COPLANER | N/A |
| CROSS-CORNER DIMENSION | N/A |
| PRELOAD, AXIAL/RADIAL | N/A |
| STIFFNESS, RADIAL/AXIAL | N/A |
| STIFFNESS, MOMENT (REF) | N/A |
| TORQUE, STARTING/RUNNING | N/A |
| ASSEMBLY RUN-OUT, ANGULAR/ | .0015° RADIAL & AXIAL |
| STATIC LOAD RATING RADIAL/ | 61.046 LBS PER ROW |
| DYNAMIC LOAD RATING RADIAL/ | 24.559 LBS PER ROW |
| ASSEMBLY IDENTIFICATION | MIL-STD-130 |

TABLE 1-continued

BEARING DATA

| | |
|---|---|
| LUBRICATION | MIL-PRF-B1322, GREASE |
| PRESERVATION/PACKAGING | MIL-DTL-197 (ITB-4001-PA1) |
| BEARING WEIGHT | 15.5 LBS CALCULATED) |
| RINGS | |
| MATERIAL/SPECIFICATION | CEVM M50 PER AWS-6490 |
| HEAT TREAT CONDITION, | HRc 60 MIN (ITB-2204) |
| STABILIZED/TEMPERED AT | −105° F. TO +1000° F. |
| RING PRECISION GRADE (ABMA | ABEC-1 |
| RACEWAY CURVATURE, INNER/ | 51%/52% |
| RACEWAY WAVINESS, | N/A |
| CROSS-RACEWAY WAVINESS | .0003 |
| SHOULDER HEIGHT, INNER/ | 25%/25% |
| TRACEABILITY | F/N'S TO ASSY S/N |
| ELEMENTS | APPROX. 83/ROW; #7/16 BALLS |
| MATERIAL/SPECIFICATION | CEVM M50 PER AWS-5490 |
| HEAT TREAT CONDITION, | HRc 50 MIN (ITB-2204) |
| STABILIZED/TEMPERED AT | −105° F. TO +1000° F. |
| BALLS PRECISION GRADE (ABMA | GRADE 25 |
| SPHERICITY, SIZE VARIATION | .000025, .000050 |
| CYLINDRICITY, SIZE VARIATION | N/A |
| TRACEABILITY | BY LOT |
| CAGE/SEPARATOR(S), (TYPE) | LOOPED WIRE CAGE |
| MATERIAL/SPECIFICATION | 17-7 PH/ASTM-A313 |
| HEAT TREAT CONDITION, | ACE HARDENED TO |
| CAGE PLATING/THICKNESS/ | ELECTROPOLISHED |
| TRACEABILITY | BY LOT |
| SEALS/SHIELDS | MOLDED SEALS |
| MATERIAL/SPECIFICATION | ASTM D-2000 |
| STYLE | N/A |
| TRACEABILITY | BY LOT |
| SURFACE FINISHES MAXIMUM AA | ANSI B46.1-95 |
| BEARING BORE AND OD | 32 AA |
| RING FACES | 32 AA |
| RACEWAYS, (T-TRANSVERSE)/(C- | T-B/C-B AA |
| ROLLING ELEMENTS, BALLS/ | 4 AA |
| RING LAND (CAGE PILOTING | 63 AA |
| CAGE DIAMETER LANDING | N/A |

In one embodiment as indicated in Table 1, the outer ring of bearing 10 has an outer diameter of about 33.65 centimeters (cm) (about 13.25 in.), while the inner ring has an inner diameter of about 29.85 cm (about 11.75 in.). The axial width W of bearing 10 is about 6.35 cm (about 2.5 in.). The balls have a diameter of about 1.11 cm (about 7/16 in.). The raceways provide a ball contact angle of about 39.5° relative to a plane through the bearing that is perpendicular to the axis of rotation A of the bearing. The spacer is heat treated and its axial width is match ground to achieve the desired assembly clearances when measured at room temperature under about 45.36 kg force (about 100 pounds) cage load The clearances are reduced to zero (no preload) and the ball contact angle is reduced to 30° when the bearing is operating at about 65° C. (about 150° F.) and mounted as follows: with the inner race clamped axially; on an aluminum shaft having a diameter of about 29.1 centimeters (cm) (about 11.46 in.) at about 21.2° C. (about 70° F.) and with an aluminum housing having an interior diameter of about 33.65 cm (about 13.25 in.) at about 21.2° C. (about 70° F.).

Figure 2:
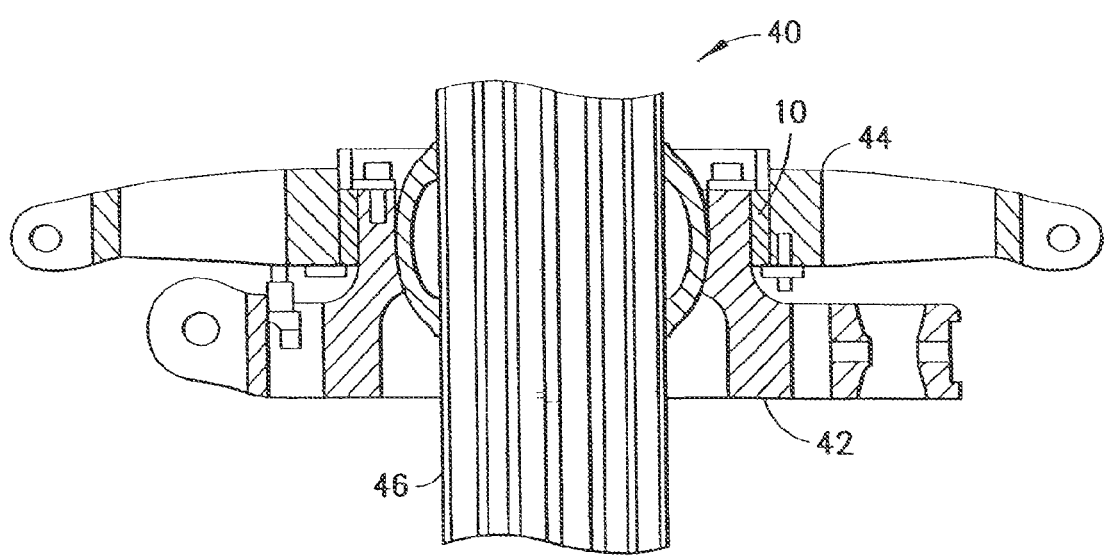
FIG. 2 is a partial schematic view of the bearing of FIG. 1 in a swashplate assembly.

A bearing as described herein is useful as the main rotor swashplate bearing for an AH-64 Apache helicopter. As seen in FIG. 2, the improved AH-64 swashplate assembly 40 includes the bearing 10 mounted between a stationary (non-rotating) swashplate 42 and a rotating swashplate 44 both mounted on a shaft 46.

As a result of the use of the M50 alloy in the bearing 10, the bearing 10 will surprisingly provide a significantly improved bearing life in the assembly of FIG. 2, relative to the prior art bearing. For example, an improvement in bearing life of about 250 to about 300%, relative to the prior art bearing having rings and balls of 52100 alloy, may be realized.

In view of the dramatic improvement in bearing life, it will be possible to use fewer balls in each set of balls in the bearing and use a thicker and/or stronger wire cage ball separator, and thus alleviate the wire cage breakage that occurs with the prior art bearing. For example, the number of balls in each set may be reduced by 2 or 3, optionally more. Increasing the loop size in the wire cage will also enable the use of thicker wire.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A swashplate assembly comprising:
   a stationary swashplate and a rotating swashplate with a ball bearing between the stationary swashplate and the rotating swashplate, the ball bearing comprising an outer ring, two inner rings, a set of balls between the outer ring and each inner ring, and a wire loop cage between each of the two inner rings and the outer ring for each set of balls, the outer ring, each of the two inner rings and the balls are formed from an M50 alloy.

2. The swashplate assembly of claim 1, wherein the M50 alloy is a CEVM alloy.

3. The swashplate assembly of claim 1, wherein the M50 alloy is a VIM-VAR alloy.

4. The swashplate assembly of claim 1, wherein the outer ring has an outer diameter of about 33.65 centimeters; the inner ring has an inner diameter of about 29.85 centimeters and the balls have a diameter of about 1.11 centimeters.

5. The swashplate assembly of claim 1 further comprising a seal between the inner rings and the outer ring, at each axial end of the bearing.

6. The swashplate assembly of claim 5 wherein the seal is manufactured from a fluorosilicone elastomer material.

7. The swashplate assembly of claim 1 further comprising a spacer ring disposed between the two inner rings.

8. The swashplate assembly of claim 7, wherein the spacer ring defines at least one flange extending therefrom and toward the outer ring.

9. The swashplate assembly of claim 7, wherein the spacer ring is formed from a 52100 alloy or a VIM-VAR M50 alloy.

10. The swashplate assembly of claim 7, wherein the spacer ring is heat treated to obtain a Rockwell C hardness of at least about 58.

11. The swashplate assembly of claim 1, wherein each set of balls consists of 83 balls.

12. The swashplate assembly of claim 1, wherein each set of balls consists of 81 balls.

13. The swashplate assembly of claim 1, wherein each set of balls consists of 80 balls.

14. The swashplate assembly of claim 1, wherein the M50 alloy consists of iron with about 0.8 percent carbon, about 4.1 percent chromium, about 4.25 percent molybdenum and about 1 percent vanadium.

* * * * *